United States Patent [19]

Clermont et al.

[11] Patent Number: 4,624,778

[45] Date of Patent: Nov. 25, 1986

[54] SPACER FOR MEMBRANE APPARATUS

[75] Inventors: Christian Clermont, Anse; Marc de Moncuit; Jacques Gauckler, both of Lyons, all of France

[73] Assignee: Hospal Industrie, Meyzieu, France

[21] Appl. No.: 544,999

[22] Filed: Oct. 24, 1983

[30] Foreign Application Priority Data

Oct. 28, 1982 [FR] France .............................. 82 18371

[51] Int. Cl.[4] .......................................... B01D 13/00
[52] U.S. Cl. .............................. 210/321.3; 210/456; 422/48
[58] Field of Search .................. 210/456, 321.3, 336, 210/331; 422/48

[56] References Cited

U.S. PATENT DOCUMENTS 3,516,548  6/1970  Alwall et al. ................... 210/321.3
3,541,595  11/1970  Edwards ........................ 210/456 X
3,578,172  5/1971  Sirotkina ....................... 210/456 X
3,623,610  11/1971  Olsen et al. ................... 210/336 X
3,920,555  11/1975  Johansson ..................... 210/34.3
4,123,363  10/1978  Koskinen ....................... 210/331

*Primary Examiner*—Frank Spear
*Attorney, Agent, or Firm*—Gerald D. Sharkin; Robert S. Honor; Walter F. Jewell

[57] ABSTRACT

Spacers for membrane exchanges whose useful exchange zone is divided by at least one transversal rib directing one of the fluids to the side of the exchange zone where it passes through orifices to circulate subsequently on the opposite face.

Application to heat and/or material exchanges with various fluids, especially biological fluids. Particular applications in haemodialysis and in blood oxygenation.

24 Claims, 5 Drawing Figures

SPACER FOR MEMBRANE APPARATUS

The present invention relates to an exchanger for fluids and more particularly to a new membrane-supporting spacer for such an exchanger.

These exchangers are generally divided, by means of a semi-permeable or impermeable membrane, into several compartments through which fluids are passed, while heat and/or material transfer takes place by diffusion and also by convection. One of the fluids which are treated can be in particular a biological fluid, for example blood or blood plasma. Such apparatuses are employed for example as haemodialysers or blood oxygenators.

Various types of spacers for supporting a plane membrane or a flattened tubular membrane are already known. These spacers can consist of a solid plate comprising, on each face, an exchange zone extending lengthwise between a distribution zone and a collection zone for one of the fluids. They also comprise means for introducing and discharging the fluids axially or laterally, as well as means ensuring leaktightness at their periphery. Such spacers have already been described, for example in European Patent Application Nos. 53,084 and 55,680.

In the case of such spacers, the exchange zone is swept on each face by a fluid, for example dialysis liquid, which flows in streamlets which are substantially parallel, though sinuous, from the distribution zone to the collection zone. These spacers generally operate in a satisfactory manner.

However, on the one hand, the fluid has to be distributed into parallel streamlets over the whole exchange surface, which can correspondingly involve relatively slow circulation speeds and, on the other hand, the pressure losses are not always equal over the whole width of the spacer, particularly near the edges. It appears therefore that the exchange efficiency could be increased by an improved distribution and circulation of the dialysis liquid and also by an increase in the useful surface area.

It is found moreover that dialysis membranes which are thin and which have a high transversal flexibility, such as the membrane marketed under the name Cuprophan ®, sag into the transversal channels separating the successive ribs for supporting the membranes. It is possible to mitigate this disadvantage by supporting the membrane with continuous ribbing but this entails the risk that the circulation of fluid in a groove from one end to the other of the exchange surface may be obstructed or blocked by the deposition of a solid particle or the attachment of a bubble between two neighbouring continuous ribs.

The object of the present invention is a spacer which does not possess the disadvantages of the prior art. More precisely, the object of the present invention is a spacer permitting a fluid flow which is distributed in a specified manner both in series and in parallel on each of the two opposite faces of the exchange zone.

Another of its objects is a spacer which permits a uniform distribution of this fluid by virtue of parallel paths which are equivalent from the point of view of the pressure losses between the distribution zone and the collection zone over the whole width of the exchange zone.

Another of its objects is a spacer which permits, for a given flow rate of the fluid flowing between the spacer and the adjacent membranes, a choice of its mean flow speed over the exchange zone by the simple determination of the angle made by the mean direction of the fluid flow with the longitudinal axis of the spacer.

Another of its objects is a spacer which employs a maximum useful surface, without a dead zone.

Another of its objects is thus a spacer which makes it possible to obtain an improved efficiency of heat and/or material transfers through a semi-permeable or even impermeable membrane.

Another of its objects is a spacer which forms an excellent membrane support because it offers the possibility of designing membrane-supporting relief elements of a great variety, especially continuous elements.

Yet another of its objects is a spacer which is simple and economical to manufacture and fit and which is reliable in use.

According to the present invention there is provided a spacer for a device for exchanging heat and/or material between fluids through at least one membrane supported by the said spacer, the spacer comprising a solid plate having on each face an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flowing between the face of the said spacer and the adjacent membrane.

Each of the spacers according to the present invention consists of a membrane-supporting plate comprising membrane-supporting relief elements on the two opposite faces.

The support plate preferably consists of a solid plate which can be pierced locally by several openings for the introduction and/or discharge of fluids and/or to facilitate the centering and the alignment on the elements on one another during the assembly of an apparatus.

This plate can be flexible or preferably rigid or semi-rigid. When it is flexible, it can be wound into a spiral and can therefore be employed in equipment of the type fitted with reels. Preferably, it retains a generally planar shape and in addition most frequently presents an elongated surface, for example a substantially rectangular surface.

The middle part of the spacer corresponds most frequently to the exchange zone. This is generally located between two zones which are similar to each other and which are intended, the first, for the distribution of a fluid toward the exchange zone and, the second, for the collection of this same fluid after it has passed through the exchange zone. They will consequently be referred to hereafter as the distribution zone and the collection zone respectively.

This exchange zone can, for example, be a zone for exchanging heat on both sides of a thin membrane which is impermeable to fluids, but most frequently it is essentially a zone for exchange of materials between two fluids through a semi-permeable membrane. Thus in a haemodialyser, exchange takes place between the blood and the dialysis liquid and, in a blood oxygenator, exchange takes place between the blood and the air or an oxygen-enriched stream if appropriate.

A spacer according to the invention may be separated from adjacent spacers either by a membrane or preferably by a pair of membranes, depending on whether the corresponding apparatus is of the "mono-membrane" or "bi-membrane" type. In the first case, two different fluids move on each side of the membrane which can, for example, be folded in zigzags around successive spacers, each of the fluids moving between one face of the membrane and the corresponding spacer.

In the second case, a first fluid moves between the pair of membranes which consists, for example, of two plane membranes which are clamped in a leaktight manner at the edges, or of one flattened tubular membrane, whilst the second fluid flows between each membrane and the corresponding spacer.

For further convenience, the present invention will now be described in greater detail and without limiting its scope, with more particular reference to a haemodialyser of the bi-membrane type comprising a stack of plane plates.

Such an apparatus consists, in a manner known per se, of a stack of spacers separating membranes which are arranged in pairs, the assembly being held clamped in a leaktight manner in an enclosing casing. Axial or, preferably, lateral orifices enable the blood and the dialysis liquid whose function is to purify the blood to be introduced and discharged respectively countercurrentwise.

The spacer according to the invention comprises means for the introduction and the discharge of fluids, a distribution zone and a collection zone for one of the fluids, together with means for ensuring peripheral leaktightness. All these means are of any known type and are not critical.

The invention relates specifically to exchange zones. The structure of these is such that they are swept by the dialysis liquid according to an original process. The dialysis liquid is in fact first distributed by any means known per se, into two streams which circulate in parallel on each face of the spacer. On at least one of the faces, for example the upper face, a continuous transversal rib, whose two ends are joined to the means which ensure peripheral leaktightness, compels the dialysis liquid to flow on the side. The dialysis liquid passes through appropriate means which are described in detail later, and then circulates on the opposite face, either of the membrane when this consists for example of a flattened tubular membrane, or of the spacer, when the membrane or membranes extend laterally as far as between the means ensuring peripheral leaktightness (see FIGS. 5 and 2 respectively).

As it circulates on the opposite face, the dialysis liquid reaches the collection zone either directly, or indirectly, after having re-circulated on the opposite faces for the required number of times. The portion of the dialysis liquid which first of all flows on the lower face follows a parallel route. All in all, each portion of the dialysis liquid sweeps successively "in series" the various compartments of the exchange zone. Together, these two portions follow two joined flat helical routes which sweep the whole exchange surface, whilst remaining within the spacers and, more precisely, within the means ensuring peripheral leaktightness of these spacers. It has been found that such a configuration of cross-currents produces a significant improvement in the efficiency of heat and/or material transfers through a semi-permeable or impermeable membrane.

The understanding of the present invention will be facilitated by the attached figures which illustrate by way of examples, diagrammatically and without a definite scale, various embodiments of spacers according to the invention.

For further convenience, the corresponding components of the spacers shown in the various figures are given the same reference numbers.

Figure 1:
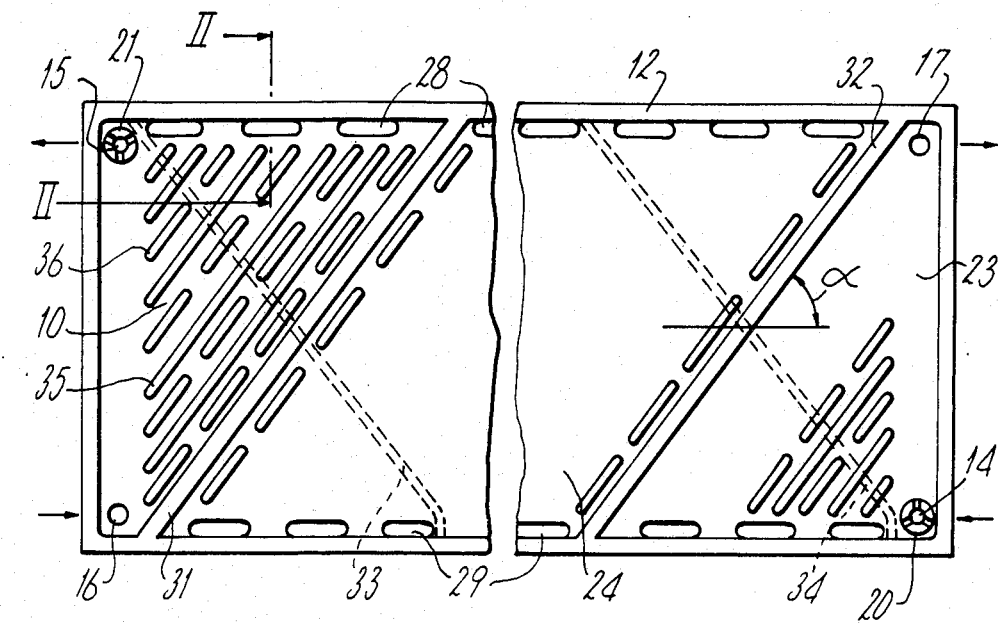
FIG. 1 is a partial plan view of a first embodiment of a spacer according to the invention.
Figure 2:
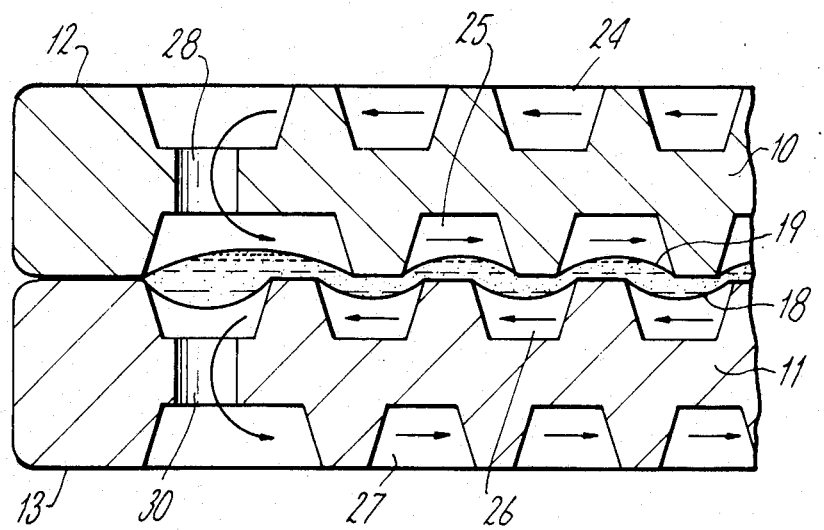
FIG. 2 is an enlarged view in partial cross-section along II—II of two spacers according to FIG. 1, which are superimposed and which clamp a pair of membranes between them.

In FIGS. 1 and 2 it is seen that the spacers 10 and 11 have the general form of a thin, rectangular, solid plate which is provided at its periphery with a continuous bead of a constant thickness 12,13 ensuring, when superposed, a peripheral leaktightness to various fluids, in a manner which is known per se.

At their side ends, in the distribution and collection zones 22,23 which are shown unhatched for simplicity, these spacers are provided with openings 14, 15, 16 and 17 for the introduction and the discharge of the blood and the dialysis liquid respectively. The dialysis liquid flows from the opening 16 to the opening 17 between each spacer and the corresponding adjacent membrane. The blood flows between a pair of membranes 18, 19 provided with openings which are positioned above the openings 14 and 15 for the blood. Rings 20, 21 of known types and fitted with radial grooves allow the blood to penetrate from the opening 14 into the space enclosed between the two membranes 18,19 and then to enter the opening 15 to be subsequently discharged.

The present invention relates specifically to the exchange zones 24,25,26,27 whose spacers 10,11 are provided on both faces, between the distribution and collection zones 22,23, within the leaktight bead 12,13.

According to the present invention at least one of the faces of the spacer 10 is divided into separate compartments by at least one continuous transversal rib-baffle connected at both of its ends to the leaktight bead 12. For example, on the upper face of the spacer shown in FIG. 1, three separate compartments are determined by two oblique ribs-baffles 31,32. Each compartment occupies the volume which is enclosed between, on the one hand, a part of the exchange zone on one face of a spacer, the part being bounded by the means ensuring peripheral leaktightness and the ribs-baffles and, on the other hand, the adjacent membrane resting on this same face of the spacer. The upper face of the ribs-baffles 31, 32. is generally in the same plane as the upper face of the leaktight bead 12 so as to support the adjacent membrane 18 in a leaktight manner.

Each rib-baffle, particularly in its middle part, guides the dialysis liquid obliquely toward one side of the exchange zone. At each end, each of the ribs 31,32 acts as a baffle compelling the dialysis liquid to change compartments so as to circulate on another face of the spacer or of the membrane.

Advantageously the spacer 10 is equipped on its two opposite faces with continuous transversal ribs-baffles which are generally oblique and identical to each other.

The ribs-baffles 33,34 situated on the lower face of the spacer are analagous with the ribs-baffles 31,32; in FIG. 1 they are shown by broken lines and appear to intersect in a symmetrical manner relative to the longitudinal axis of the spacer.

According to an advantageous feature of the present invention, the exchange zone of the spacer can be provided with orifices permitting the dialysis liquid which has already flowed over a part of the exchange zone between each face of the spacer and the corresponding adjacent membrane to cross the whole thickness of the spacer so as to appear on the opposite face of the spacer and to continue its flow through the exchange zone until reaching the collection zone directly or indirectly.

The spacer according to FIG. 1 is therefore provided with a first series of orifices 28 arranged longitudinally within the exchange zone, near the leaktight bead 12. Through the orifices 28 which form a series of orifices of a first group, the dialysis liquid flows from the upper face of the spacer to the lower face (see FIG. 2) into the space between the exchange zone of the spacer and the adjacent membrane 19.

The same spacer is also provided with a second series of orifices 29 arranged within the exchange zone near the longitudinal leaktight bead which faces the preceding bead. Through orifices 29 which form a series of orifices of a second group, the dialysis liquid flows from the lower face of the spacer to the upper face, into the space between the exchange zone of the spacer and the adjacent membrane.

The adjacent spacers such as 11 are naturally identical to the spacer 10 and are provided with orifices 30 which are identical to the orifices 28 (compare FIG. 2).

It is thus apparent that the dialysis liquid which enters the distribution zone 22 of the spacer 10 through the orifice 16 is simultaneously distributed onto its lower and upper faces by any means which are known per se (not shown). On the exchange surface the upper portion, which is channelled by the rib-baffle 31 arrives at the lower face through the orifices 26, then, by crossing the lower face, reaches the orifices 29 and once again crosses the upper face of the exchange zone. This route is repeated until reaching the collection zone 23 and the orifice 17 through which it is discharged.

Simultaneously, the lower portion, which is channelled by the rib-baffle 33 arrives at the orifices 29 from which it reaches the upper face which it crosses as far as the orifices 28, and so on, until it also reaches the collection zone 23 and the discharge orifice 17.

The blood, on the other hand, circulates between the orifices 14 and 15, in a general countercurrent direction, in the space enclosed between the membranes 18 and 19. The blood can cross freely each rib-baffle between the membranes, since the ribs-baffles of two adjacent spacers facing each other are generally in contact at a number of points, leaving a free passage either above or below on either side.

It will be noted that the ribs-baffles 31,32,33, 34 fulfil generally a double baffling function: firstly, that of channelling the dialysis liquid on the side toward the orifices 28,29, with the adjacent membrane resting over their whole length; secondly, through contact with at least the various corresponding elements of the opposite face and the adjacent spacers, that of maintaining, at one or more points of contact, a predetermined gap between the spacers and the membranes whose stacking forms the exchanger.

It is known that it is preferable for the dialysis liquid to sweep the exchange surface by flowing along paths all of which are substantially of the same length, present the same obstacles, and thus result in the same pressure losses. This condition is necessary for obtaining a uniform sweep of the exchange surface and avoiding both the dead zones and preferential channelling. For this reason all the portions of the dialysis liquid need especially to cross the exchange surface of the spacer the same number of times, say n; n is an integer generally between 0 and 10 and preferably between 0 and 5.

Moreover, the ribs-baffles 31,32,33,34 are preferably rectilinear and are, on average, inclined at an angle alpha relative to the longitudinal axis of the spacer, for example between their two ends in contact with the leaktight bead 12. The tangent of the angle alpha is equal to the ratio of the width of the exchange surface to a part of its length. In order that all the portions of the dialysis liquid pass through the exchange zone of the spacer n times, it is sufficient that the tangent alpha be equal to the ratio of the width of the exchange surface to its length divided by n.

If n is varied, for example increased, alpha increases the width of the passage which is offered to the dialysis liquid decreases, and hence, at a given constant flow rate, the flow speed increases. Thus the possibility exists, according to the invention, of choosing, for a given flow rate of the dialysis liquid, an optimum range of flow speeds and consequently of improving exchange efficiency.

Figure 3:
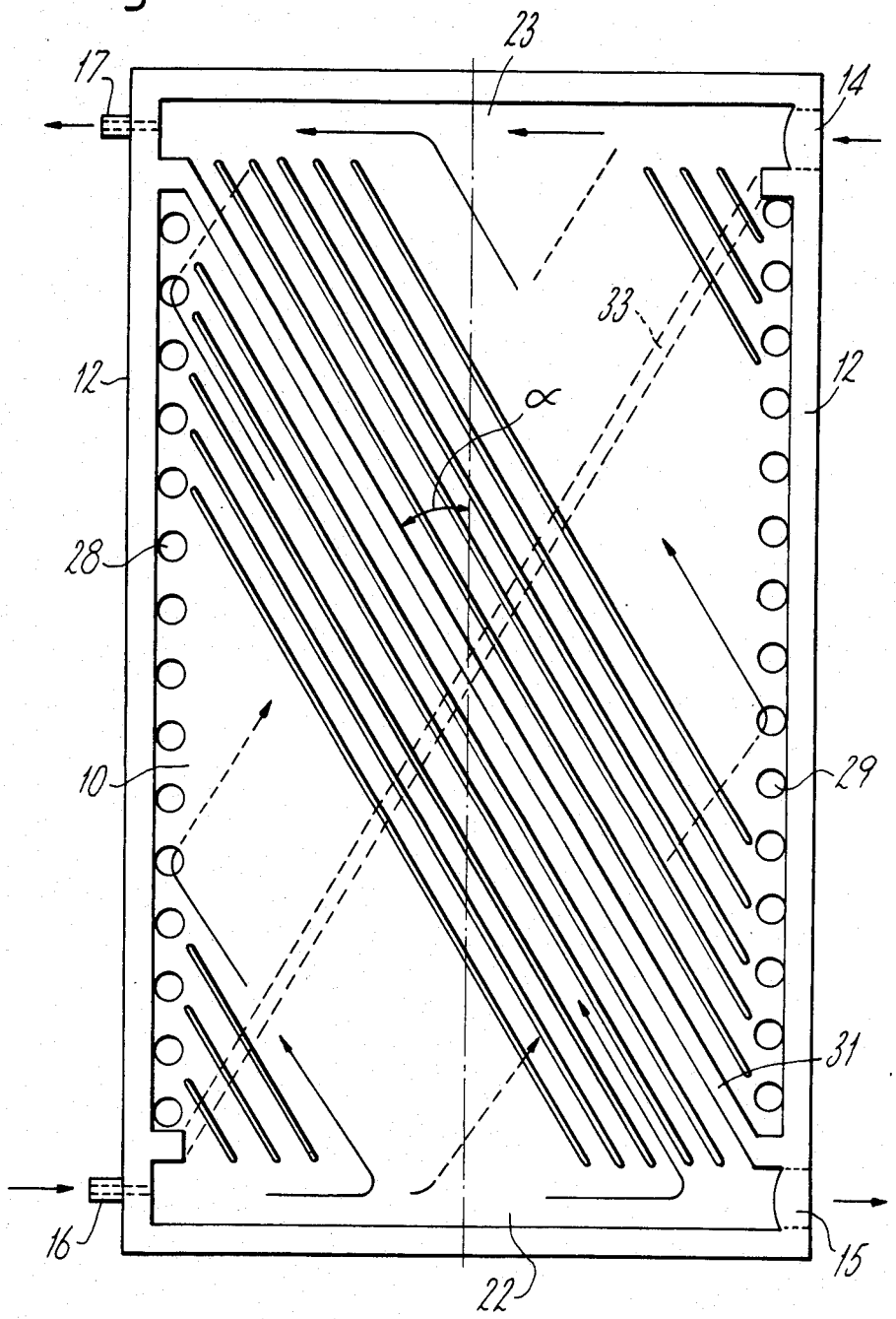
FIG. 3 is the plan view of a second embodiment of the spacer according to the invention.

Thus FIG. 3 shows a spacer of a preferred type characterised by n=1, that is to say that any portion of the dialysis liquid crosses the exchange zone only once to pass from the upper face to the lower face and vice versa between the distribution zone and the collection zone.

This result can be produced and even ensured by the presence of a continuous rib-baffle 31 which is connected to the two longitudinal leaktight beads 12, and of its homologue 33 (broken lines) on each of the opposite faces of the exchange zone of the spacer. Each rib-baffle 31,33 is thus substantially parallel to the diagonals of the exchange surface.

Figure 4:
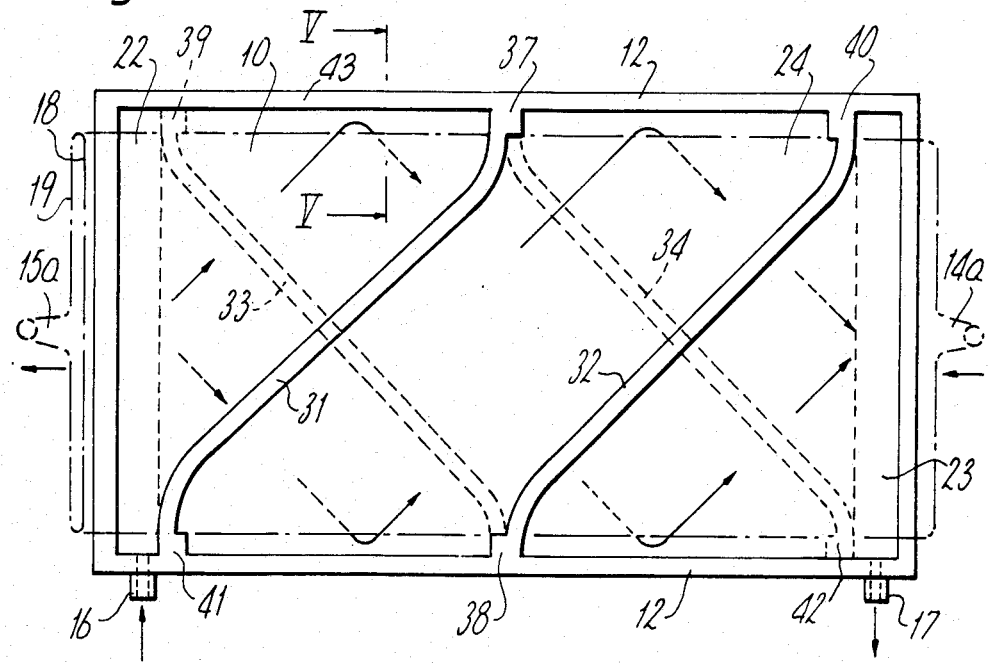
FIG. 4 is the plan view of a third embodiment of the spacer according to the invention.
Figure 5:
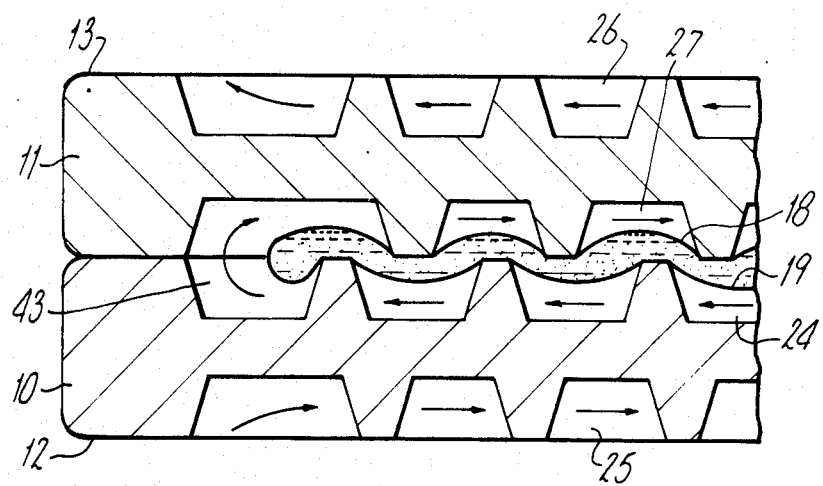
FIG. 5 is the enlarged view in partial cross-section along V—V of two spacers according to FIG. 4 which are superimposed and clamp between them a flattened membrane of the tubular type.

The spacers shown in FIGS. 4 and 5 illustrate another embodiment of the present invention. The membrane 18,19 is of the flattened tubular type; its interior is crossed by the blood which, for example, enters and is discharged through axial orifices, respectively 14a and 15a. This membrane has the general shape of a closed pocket which, for the sake of clarity, is shown in FIG. 4 by dot-and-dash lines overlapping the spacer 10. In actual fact, only the orifices 14a and 15a extend clearly beyond the spacer 10 and cross the peripheral leaktightness device 12 which is locally curved at their position.

The ribs-baffles 31 and 34 on the one hand, and 32,33 on the other hand, overlap at their ends to form buffers 37 and 38 together. These buffers match local internal excrescences of the device for peripheral leaktightness 12 and 13 in its longitudinal parts. Such excrescences 39,40,41,42 are arranged especially at the four corners of the exchange zone.

The dialysis liquid which circulates, for example, on the upper face of the spacer 10 and at first under the membrane 18,19 in the compartment to the left of the rib-baffle 31 passes around the membrane laterally and then flows onto it (see arrows) by passing through the orifice 43 provided, on the one hand, between the longitudinal devices ensuring leaktightness of the spacers 10 and 11 and the membrane 18,19 and, on the other hand, between the buffers 37 and 39.

Thus all of the dialysis liquid which flows through this first compartment passes around the membrane 18,19 through a single orifice. In this particular embodiment this orifice does not pass through the wall of a spacer. It consists of a narrow longitudinal cavity such as a groove arranged within and against the longitudinal parts of the device ensuring peripheral leaktightness of each spacer. When two spacers are superimposed, the two grooves face each other and form the cavity constituting the orifice 43 through which the dialysis liquid passes around the membrane to flow from the lower face to the upper face or vice versa. Most frequently each groove is formed by the absence of the membrane support relief at this location. A new means is thus provided permitting a liquid to be circulated around a membrane in two portions conjointly following two flattened helical routes which sweep and intercross over the whole exchange surface whilst remaining within the exchange zone of the spacers.

Naturally, if appropriate, it is possible, for example with plane membranes which are folded on one side and spacers provided with orifices only on one side, to combine in numerous ways the various embodiments which are described and shown above, with the dialysis liquid circulating, for example, in alternate zigzags around a pair of membranes and around a spacer.

Naturally the membranes such as 18,19 are supported by the spacers not only by means of the ribs-baffles 31,32,33,34 but also by relief elements of any type known per se: continuous or discontinuous ribs, or points of multiple contact in the shape of cones, pyramids, prisms and the like. For example, FIG. 1 shows continuous ribs 35 alternating with discontinuous ribs 36 which are parallel to the ribs-baffles 31,32,33,34 and intercrossing back-to-back with the homologous ribs of the opposite face. The relative arrangement of these different membrane-supporting relief elements is of a type which is known per se. These elements can for example be arranged in the general direction of flow of the dialysis liquid, in zigzags, or in a wave pattern.

Advantageously these ribs, continuous or discontinuous, which guide the flow of the dialysis liquid and support the membrane can have a longitudinal profile of nonuniform height, as described in European Patent Application No. 55,680. Similarly, they can be of slightly different heights, as described, for example, in European Patent Application No. 64,931. These last two arrangements can if necessary be combined together.

Among the various advantages of the new structure of spacers according to the invention should be noted an excellent support of thin and flexible membranes, due to sets of ribs which are continuous and oblique relative to the membrane-stretching direction. These ribs thus permit a redistribution of the circulating fluid between the spacer and the membrane at every change of compartment, which avoids the disadvantages experienced previously, particularly of a groove being put out of circulation across the whole exchange zone.

It is also noted that the manufacture of these spacers presents no particular difficulty; that once they have been assembled into exchangers, their retention in position is improved by the action of the ribs-baffles whose intercrossing superimposition forms pillars of a constant height; and that leaktightness is produced by simple clamping of the spacers and superimposed membranes, leading to excellent reliability together with good compactness and favorable economy of manufacture and use.

The shape, number and the relative arrangement of the ribs-baffles such as 31,32,33,34 and orifices such as 28,29,43 can of course lend themselves to various modifications within the reach of those skilled in the art without departing from the scope of the present invention.

We claim:

1. A spacer for a device for exchanging heat and/or material between fluids through at least one membrane supported by the said spacer, the spacer comprising a solid plate having a pair of opposed, major faces, on each face of which is defined an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flowing between the face of the said spacer and the adjacent membrane into a least one longitudinal cavity aligned within the longitudinal edge of the spacer.

2. A spacer according to claim 1, wherein each of its opposite faces is divided into separate compartments by at least one such rib.

3. A spacer according to claim 2, wherein the at least one rib on one face of the plate crosses the at least one rib on the other face of the plate and at the points of contact maintain the membranes and the adjacent spacers at accurate constant distances.

4. A spacer according to claim 1, wherein the said means ensuring peripheral leak-tightness are equipped at their longitudinal parts, at points of contact with the at least one rib, with internal formations forming buffers on which the membrane bears in a leakproof manner.

5. A spacer according to claim 1, wherein the said exchange surface is of a generally rectangular shape and the at least one rib forms an angle with the longitudinal axis of the spacer whose tangent is equal to the ratio of the width of the said exchange surface to its length divided by n, n being an integer between 0 and 10.

6. A spacer according to claim 5, wherein n=1; the said rib being substantially parallel to the diagonals of the exchange surface.

7. A spacer according to claim 1, wherein in the said exchange zone the relief elements supporting the membrane consist of further ribs which are substantially parallel to the first mentioned rib.

8. A spacer according to claim 7, wherein the further ribs have a longitudinal profile of non-uniform height.

9. A spacer according to claim 7, wherein the further ribs are of slightly different heights.

10. A device for exchanging heat and/or material between fluids, the device comprising at least one exchange membrane through and at least one spacer supporting same, the spacer comprising a solid plate having a pair of opposed, major faces, on each face an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends connected to the said means for ensuring peripheral leaktightness, the said rib forming a leaktight baffle which channels and directs on one side the fluid flowing between the face of the said spacer and the adjacent membrane into at least one longitudinal cavity aligned within the longitudinal edge of the spacer.

11. A spacer for haemodialyser and/or blood oxygenator comprising a solid plate having a pair of opposed, major faces, on each face of which is defined an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flowing between the face of the said spacer and the adjacent membrane into at least one longitudinal cavity aligned within the longitudinal edge of the spacer.

12. A spacer for a device for exchanging heat and/or material between fluids through at least one membrane supported by the said spacer, the spacer comprising a solid plate having a pair of opposed, major faces, on each face of which is defined an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flowing between the face of the said spacer and the adjacent membrane, wherein in the said exchange zone there is associated with the at least one rib means defining at least one orifice provided through the thickness of the spacer, permitting a fluid to flow from one face of the spacer to the opposite face.

13. A spacer according to claim 12, wherein in the exchange zone there is means defining a plurality of orifices of a first group permitting the said fluid to flow from a first one of the faces of the exchange zone to the opposite face, and there is also means defining a plurality of orifices of a second group permitting the said fluid to flow from the opposite face of the exchange zone to the said first face.

14. A spacer according to claim 13, wherein the said orifices of the first and of the second groups are correspondingly aligned within both longitudinal edges of the spacer.

15. A spacer according to claim 12, wherein each of its opposite faces is divided into separate compartments by at least one such rib.

16. A spacer according to claim 15, wherein the at least one rib on one face of the plate crosses the at least one rib on the other face of the plate and at the points of contact maintain the membranes and the adjacent spacers at accurate constant distances.

17. A spacer according to claim 12, wherein the said means ensuring peripheral leaktightness are equipped at their longitudinal parts, at points of contact with the at least one rib, with internal formations forming buffers on which the membrane bears in a leakproof manner.

18. A spacer according to claim 12, wherein the said exchange surface is of a generally rectangular shape and the at least one rib forms an angle with the longitudinal axis of the spacer whose tangent is equal to the ratio of the width of the said exchange surface to its length divided by n, n being an integer between 0 and 10.

19. A spacer according to claim 18, wherein n=1, the said rib being substantially parallel to the diagonals of the exchange surface.

20. A spacer according to claim 12, wherein in the said exchange zone the relief elements supporting the membrane consist of further ribs which are substantially parallel to the first mentioned rib.

21. A spacer according to claim 20, wherein the further ribs have a longitudinal profile of non-uniform height.

22. A spacer according to claim 20, wherein the further ribs are of slightly different heights.

23. A device for exchange heat and/or material between fluids, the device comprising at least one exchange membrane through and at least one spacer supporting same, the spacer comprising a solid plate having a pair of opposed, major faces, on each face an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flow between the face of the said spacer and the adjacent membrane, wherein in the said exchange zone there is associated with the at least one rib means defining at least one orifice provided through the thickness of the spacer, permitting a fluid to flow from one face of the spacer to the opposite face.

24. A spacer for haemodialyzer and/or blood oxygenator comprising a solid plate having a pair of opposed, major faces, on each face of which is defined an exchange zone extending longitudinally between a distribution zone and a collection zone for one of the fluids, means for ensuring peripheral leaktightness, the said exchange zone being divided on at least one of the faces of the said solid plate into separate compartments by at least one continuous transversal rib whose two ends are connected to the said means for ensuring peripheral leaktightness, the said rib forming a leaktight baffle which channels and directs on one side the fluid flowing between the face of the said spacer and the adjacent membrane, wherein in the said exchange zone there is associated with the at least one rib means defining at least one orifice provided through the thickness of the spacer, permitting a fluid to flow from one face of the spacer to the opposite face.

* * * * *